United States Patent
Garakani et al.

(10) Patent No.: US 7,058,066 B1
(45) Date of Patent: Jun. 6, 2006

(54) CONTROLLING THE TRANSITION GLITCH THAT OCCURS WHEN A GATEWAY SWITCHES FROM VOICE OVER IP TO VOICE BAND DATA

(75) Inventors: Mehryar Khalili Garakani, Westlake Village, CA (US); Nicholas Cutaia, Brighton, MA (US); Hanh Luong, Santa Barbara, CA (US)

(73) Assignee: Cisco Technologies, Inc., San Jose, CA (US)

( * ) Notice: Subject to any disclaimer, the term of this patent is extended or adjusted under 35 U.S.C. 154(b) by 70 days.

(21) Appl. No.: 10/763,771

(22) Filed: Jan. 22, 2004

(51) Int. Cl.
*H04L 12/56* (2006.01)
*H04J 3/12* (2006.01)

(52) U.S. Cl. ...................... 370/401; 370/526
(58) Field of Classification Search ............... 370/401, 370/389, 392, 516, 356, 526, 352
See application file for complete search history.

(56) References Cited

U.S. PATENT DOCUMENTS

| | | | |
|---|---|---|---|
| 6,665,283 B1 | 12/2003 | Harris et al. | 370/333 |
| 6,754,715 B1 | 6/2004 | Cannon et al. | 709/231 |
| 6,788,651 B1 * | 9/2004 | Brent et al. | 370/255 |
| 6,826,177 B1 * | 11/2004 | Chan et al. | 370/352 |
| 6,870,876 B1 | 3/2005 | Nohlgren et al. | 375/220 |
| 6,873,954 B1 | 3/2005 | Sundqvist et al. | 704/262 |
| 2003/0185222 A1 * | 10/2003 | Goldstein | 370/401 |
| 2003/0206563 A1 * | 11/2003 | Lazarus et al. | 370/526 |
| 2004/0190499 A1 * | 9/2004 | Chan et al. | 370/352 |
| 2005/0047396 A1 * | 3/2005 | Helm et al. | 370/352 |

OTHER PUBLICATIONS

*Adaptive Joint Playout Buffer and FEC Adjustment for Internet Telephony* From: IEEE InfoCom Website : www.ieee-infocom.org 2003 pp. 1-15.
*A Simulation Study of Adaptive Voice Communications on IP Networks* A. Barberis, C. Casetti, J.C. DeMartin, M Meo From Website: www.elsevier.com Copyright 2001; pp. 757-767.

(Continued)

*Primary Examiner*—Chi Pham
*Assistant Examiner*—Ronald Abelson
(74) *Attorney, Agent, or Firm*—Marger Johnson & McCollom, P.C.

(57) ABSTRACT

In a gateway router the length of the play-out buffer in VBD mode is not set at a previously established value. Instead the length of the play-out buffer in VBD mode is determined by the length of the buffer in the previous audio mode. When the system switches from audio mode to VDB mode, the length of the play-out buffer in audio mode is noted. The length of the play-out buffer in VBD mode is then set equal to its length in the prior audio mode plus a dilation factor. An audio concealment algorithm (which fills in gaps caused by missed packets) is used during the transition from audio to VDB to conceal any transition glitch during the answer tone.

23 Claims, 2 Drawing Sheets

OTHER PUBLICATIONS

*Perceptually-Evaluated Loss-Delay Controlled Adaptive Transmission of MPEG Video Over IP* G. Favini, D. Quaglia, J.C. DeMartin, C. Casetti From Website: www.elsevier.com 2003 IEEE 5 Pages.

*Playout Buffer Management* National University of Singapore From Website: www.comp.nus.edu pp. 1-87.
*VoIP Playout Buffer Adjustment Using Adaptive Estimation of Network Delays*; Miroslaw Narbutt, Liam Murphy; From Website: www.eeng.dcu.ie 2003 10 Pages.

\* cited by examiner

CONTROLLING THE TRANSITION GLITCH THAT OCCURS WHEN A GATEWAY SWITCHES FROM VOICE OVER IP TO VOICE BAND DATA

FIELD OF THE INVENTION

The present invention relates to IP (Internet Protocol) networks and more particularly to the transmission of voice and data over IP networks.

BACKGROUND OF THE INVENTION

Data is transmitted over the Internet in the form of packets. When a voice signal is transmitted over the internet the gateways operate in what is called "audio mode". In audio mode, the continuous voice signal is divided into packets, the packets are transmitted over the Internet, and at the receiving end, the packets are again assembled into a continuous voice signal. Since the time required for packets to travel over the internet is variable, the gateway at the receiving end includes a play-out buffer which receives and stores packets for a small interval. By storing received packets for a short interval, the play-out buffer provides a better opportunity for the system to assemble the packets in the correct order.

Setting the length of the play-out buffer involves a tradeoff between setting the delay too long or too short. If the play-out buffer is too long, it will introduce too much latency which is annoying in a telephone conversation, on the other hand, if the length of the play-out buffer is too short too many packets will be missed. Generally the length of the play-out buffer is set adaptively such that the length of the buffer is dependent upon the characteristics of the network at each particular instant in time. There is a large amount of technical literature devoted to various techniques for making the length of the play-out buffer adaptive.

When data from a modem or fax is transmitted over the Internet, the data is generally transmitted as Voice Band Data (VBD). When a gateway detects signals from a modem or fax, the gateway switches to VBD mode.

When a gateway is operating in VBD mode, the play-out buffer is typically set to a relatively long value (for example, a value exceeding 100 ms). The reason for this is that VBD is more tolerant to delay than is voice data; however, VBD is less tolerant of missed packets than is voice data.

When a modem (or fax) places a call to a second modem (or fax) the routers in the system detects the answer tone from the second modem (or fax) and the network gateways switch from audio mode to VBD mode. When this transitions occurs, the system switches from what may be a relatively short play-out buffer in audio mode to a relatively long play-out buffer in VBD mode. When the switch in buffer length occurs, there will be a gap in the answer tone which is received by the calling station.

For example, consider what occurs when a system is operating in audio mode with a play-out buffer of 50 ms and the system detects an answer tone and switches to a 200 ms play-out buffer. At the receiving end there will be a gap in the signal of about 150 ms. When the answering system encounters this gap it may assume that the answering system dropped off the line and it may drop off the line. It has been found that gaps even as small as 30 to 50 ms can cause a significant drop in the call success rate of 10 to 20 percent with some client devices. It is noted that it may take a voice gateway in the neighborhood of 250 ms to detect an answer tone. Thus, the gap caused by switching from audio mode to VBD mode will normally occur after the calling machine begins receiving the answer tone. It is noted that if the gap had been in the beginning part (the first 50 to 100 ms) of the answer tone, the gap would have little if any effect since the answering machine would not as yet have recognized the answer tone.

The problem addressed by the present invention, is the anomaly that occurs when a system switches from audio mode (with a short play-out buffer) to VBD mode (with a long play-out buffer).

SUMMARY OF THE INVENTION

With the present invention, the length of the play-out buffer in VBD mode is not set to a previously established value. Instead the length of the play-out buffer in VBD mode is determined by the length of the buffer in the previous audio mode. When the system switches from audio mode to VDB mode, the final length of the play-out buffer in audio mode is noted. The length of the play-out buffer in VBD mode is then set equal to its length in the prior audio mode just before the transition occurred plus a dilation factor. An audio concealment algorithm (which fills in gaps caused by missed packets) is used during the transition from audio to VDB.

DETAILED DESCRIPTION OF PREFERRED EMBODIMENTS

Figure 1:
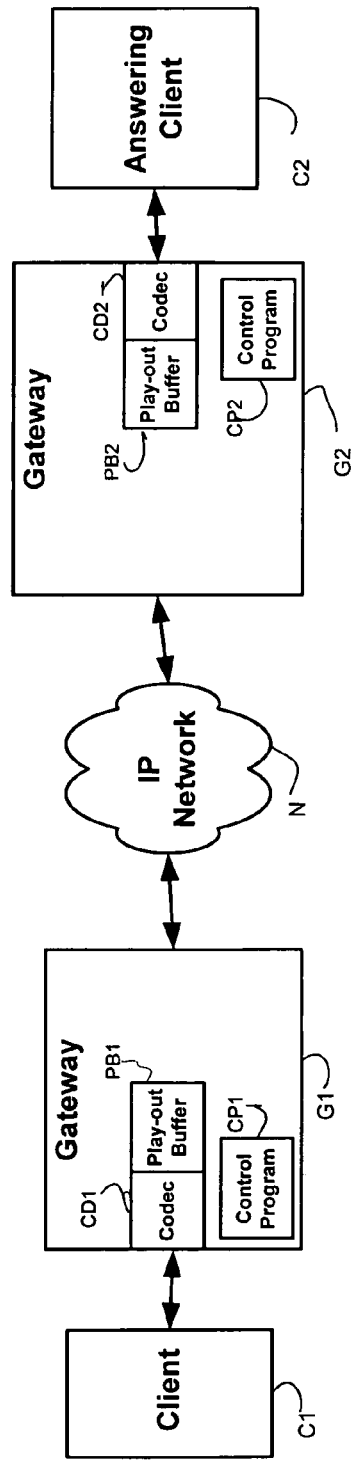
FIG. 1 is an overall system diagram.

The overall configuration of a system which embodies a first embodiment of the present invention is shown in FIG. 1. The system shown includes a first client designated C1 and a second client designated C2. The clients C1 and C2 can be either fax machines or modems.

The clients are connected through gateways G1 and G2 and network N. The gateways G1 and G2 include codecs CD1 and CD2, play-out buffers PB1 and PB2 and control programs CP1 and CP2. In normal operation, the clients receive information as follows: packets received from the network are assembled in the play-out buffers PB1 and PB2 and then passed to the codecs CD1 and CD2. The codecs change the digital information to analog information and pass the analog information to the clients. When clients are sending information the clients provide analog information to the codec, the codecs digitize the information and the gateway assembles the digital information into internet packets. The above described operations are the conventional manner in which gateways operate.

Figure 2:
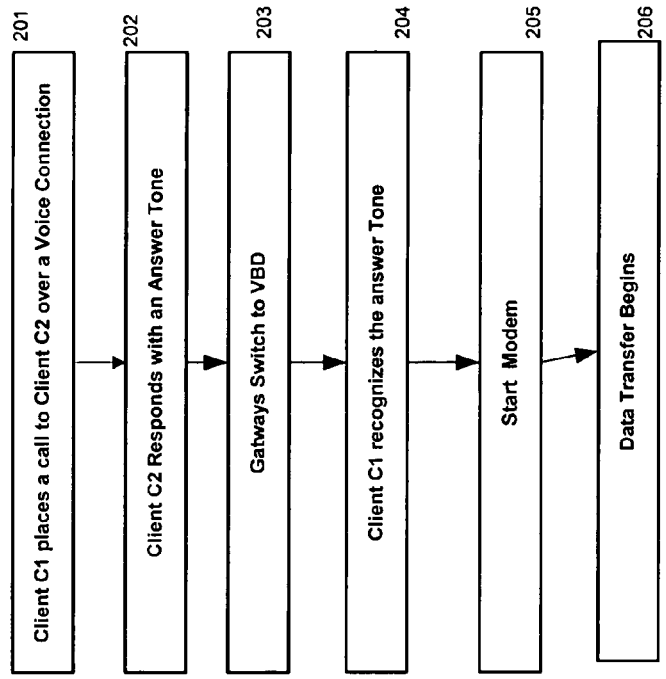
FIG. 2 is a diagram that shows the operations that occur.

The gateways G1 and G2 can be conventional, commercially available gateways such as those marketed by the Cisco Corporation under the family designation AS53xx, 26xx, or 37xx Alternatively, the gateways G1 and G2 could be various other commercially available gateways. The present invention can be implemented by modifying the control programming as explained below. FIG. 2 gives the sequence of operations which occur when client C1 places a call to client C2. The initial contact between the clients is over a normal audio or voice connection as indicated by block 201. As indicated by block 202, client C2 responds to the call with an answer tone. The gateways detect the answer tone as indicated by block 203 and they switch to VBD mode. What occurs relative to the play-out buffer when this occurs will be explained later. Under normal circumstances the client C1 recognizes the answer tone as indicated by block 204 and brings up its modem as indicated by block 205. Data transmission then begins as indicated by block 206.

When the system is operating in audio mode, the length of the play-out buffers is set in an adaptive manner depending upon the conditions of the system. The algorithm for setting the length of the play-out buffer, tries to balance the length of the buffer between the following two considerations:

1) A long play-out buffer can minimize the number of packets that are missed; however, it can introduce unacceptable delay in telephone calls.
2) A short play-out buffer can minimize call delay; however, it may cause too many packets to be missed.

The length of the play-out buffer is generally set adaptively in audio mode to take into account the instantaneous condition of the network. There is a great deal of technical literature which teaches how to adaptively managing the length of a play-out buffer. In the embodiment described here, when the gateways G1 and G2 are in audio mode, they adaptively control the length of the play-out buffer in accordance with the prior art teachings.

The problem addressed by the present invention is what occurs when the system switches between audio mode and VBD mode. If, for example, the system is in audio mode with a 50 ms play-out buffer and the system switches to a 200 ms buffer in VBD mode, the will be a gap of 150 ms in the signal received by the client. If this transition occurs while the client is receiving an answer tone, this can cause the receiving client to drop the call.

Figure 3:
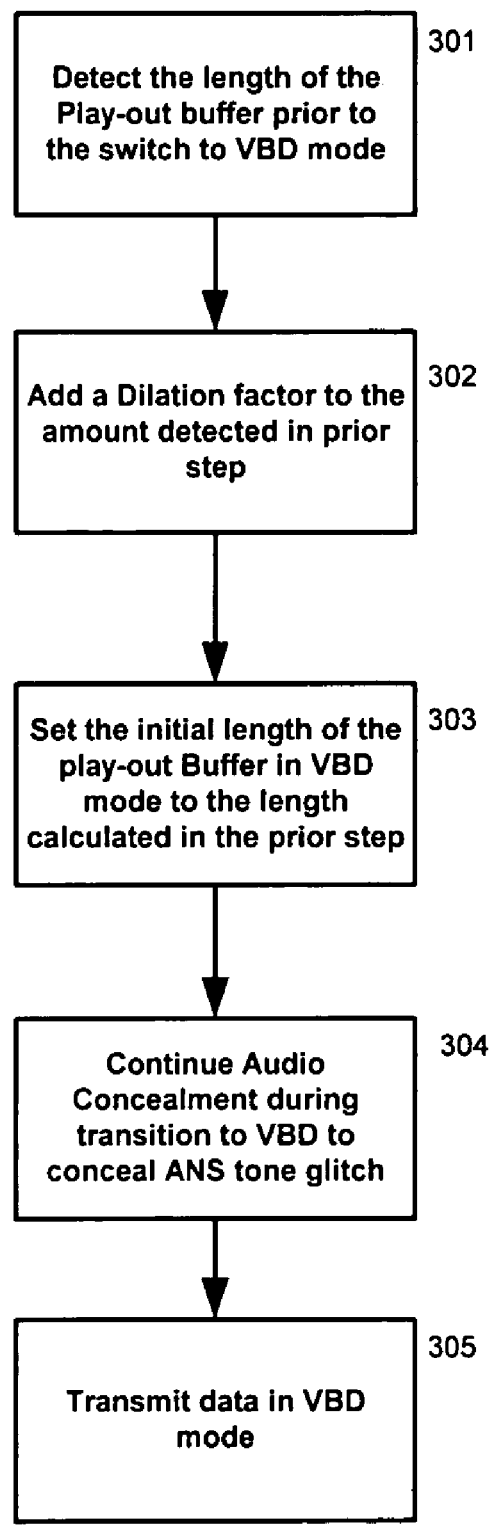
FIG. 3 is a flow diagram showing the operation of the system.

With the present invention, during the transition audio concealment is use to fill in for any missed packets. With the present invention when a system switches from audio mode to VDB mode, the steps shown in FIG. 3 occurs.

First, as indicated by block 301, the system detects the length of the play-out buffer at the instant prior to the change over. Next as indicated by block 302 a dilation factor "D" is added to the detected amount. The play-out buffer is then set to the sum of the prior amount plus the value of the dilation factor as indicated by block 303. Any gaps which result due to this change in value are filled in using conventional audio concealment techniques as indicated by block 304. Since audio concealment techniques are applied, there will not be gaps in the amount of energy in the signal produced. There may be anomalies or "glitches" in the phase of the signal; however, these are normally benign to the client modems as long as transition to VBD occurs soon after the switch over (i.e., less than 400 ms since start of ANS signal). Finally data transmission begins as indicated by block 305.

The magnitude of the dilation factor "D" should be large enough so as to not increase the possibility of missed packets during VBD mode. It should also be small enough, so any resulting glitch can be covered by the concealment algorithm. A dilation factor "D" of 50 ms has been found to be satisfactory in many normal situations.

It is noted that the clients shown in FIG. 1 could be either fax machines or a modems which place calls to a second fax machine or modem. The gateways switch from audio mode to VDB data mode when the gateways detect the answer tone from the client being called. This occurs in a conventional manner. The present invention is only directed to a technique for setting the length of the play-out buffer when this transitions occurs.

In summary, with the present invention, when a gateway switches from audio mode to VBD mode, the length of the play-out buffer is increased by an amount that is dependent on its value in the previous audio made. When the switch is made from audio mode to VBD mode, the length of the play-out buffer is set to a value which is the sum of it previous length in the audio mode and a dilation factor. As a result, with the present invention the call success rate is increased.

While the invention has been described with reference to a preferred embodiment thereof, it should be understood that various changes in form and detail can be made without departing from the spirit and scope of the invention.

We claim:

1. A method of operating a gateway comprising:
   setting the length of the play-out buffer in a gateway when the gateway switches from audio mode to voice band data (VBD) mode by;
   detecting the previous length of the play-out buffer in the previous audio mode, adding a dilation factor to said previous length to obtain a new length, and setting said play-out buffer to said new length.

2. A system for operating a gateway comprising:
   setting the length of the play-out buffer in a gateway when the gateway switches from audio mode to voice band data (VBD) mode by;
   means for detecting the previous length of the play-out buffer in the previous audio mode,
   means for adding a dilation factor to said previous length to obtain a new length, and means for setting said play-out buffer to said new length.

3. The method recited in claim 1 wherein the length of said play-out buffer in audio mode is set adaptively.

4. The system recited in claim 2 wherein the length of said play-out buffer in audio mode is set adaptively.

5. The method recited in claim 1 wherein audio concealment techniques are used to fill any gaps caused by the change in length of the play-out buffer.

6. The system recited in claim 2 wherein audio concealment techniques are used to fill any gaps caused by the change in length of the play-out buffer.

7. The method recited in claim 1 wherein said switch from audio mode to VBD mode occurs when a first client places a call to a second client and said second client generates an answer tone.

8. The system recited in claim 2 wherein said switch from audio mode to VBD mode occurs when a first client places a call to a second client and said second client generates an answer tone.

9. The method recited in claim 3 wherein audio concealment techniques are used to fill any gaps caused by the change in length of the play-out buffer.

10. The system recited in claim 4 wherein audio concealment techniques are used to fill any gaps caused by the change in length of the play-out buffer.

11. The method recited in claim 7 wherein said gateway detects said answer tone and therefore initiates a switch from audio mode to VBD mode.

12. The system recited in claim 8 wherein said gateway detects said answer tone and therefore initiates a switch from audio mode to VBD mode.

13. A method of operating a gateway when a first client places a call to a second client in audio mode, causing said second client to generate an answer tone, said method including:
   said gateway detecting said answer tone causing said gateway to switch to Voice Band Data (VBD) mode,
   detecting the previous length of the play-out buffer in the previous audio mode, adding a dilation factor to said previous length to obtain a new length, and switching said gateway from audio mode to VBD mode with said play-out buffer set to said new length.

14. A system operable a gateway when a first client places a call to a second client in audio mode, causing said second client to generate an answer tone, and said gateway detecting said answer tone, the combination of:

means causing said gateway to switch to Voice Band Data (VBD) mode, means for detecting the previous length of the play-out buffer in the previous audio mode, means for adding a dilation factor to said previous length to obtain a new length, and means for switching said gateway from audio mode to VBD mode with said play-out buffer set to said new length.

15. The method recited in claim 13 wherein the length of said play-out buffer in audio mode is set adaptively.

16. The system recited in claim 14 wherein the length of said play-out buffer in audio mode is set adaptively.

17. The method recited in claim 13 wherein audio concealment techniques are used to fill any gaps caused by the change in length of the play-out buffer.

18. The system recited in claim 14 wherein audio concealment techniques are used to fill any gaps caused by the change in length of the play-out buffer.

19. The method recited in claim 15 wherein audio concealment techniques are used to fill any gaps caused by the change in length of the play-out buffer.

20. The system recited in claim 16 wherein audio concealment techniques are used to fill any gaps caused by the change in length of the play-out buffer.

21. A computer readable medium having stored thereon computer instructions for causing a gateway to:

set the length of the play-out buffer in a gateway when the gateway switches from audio mode to voice band data (VBD) mode by:

detecting the previous length of the play-out buffer in the previous audio mode, adding a dilation factor to said previous length to obtain a new length, and setting said playout buffer to said new length.

22. The computer readable medium recited in claim 21 wherein the length of said play-out buffer in audio mode is set adaptively.

23. The computer readable medium recited in claim 21 wherein audio concealment techniques are used to fill any gaps caused by the change in length of the play-out buffer.

* * * * *